(12) United States Patent
Ito et al.

(10) Patent No.: US 6,451,445 B1
(45) Date of Patent: Sep. 17, 2002

(54) HEAT SHRINKABLE POLYESTER FILM

(75) Inventors: Hideki Ito, Aichi (JP); Norimi Tabota, Aichi (JP); Tsutomu Oko, Aichi (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 09/574,881

(22) Filed: May 19, 2000

(30) Foreign Application Priority Data

May 21, 1999 (JP) ............................................. 11-142406

(51) Int. Cl.[7] .......................... B32B 27/06; B29C 47/00; B29C 55/00
(52) U.S. Cl. ............... 428/480; 264/176.1; 264/177.17; 264/177.19; 264/210.7; 264/290.2; 528/272
(58) Field of Search .................................. 428/156, 480; 283/81; 528/272; 156/244.11; 264/176.1, 177.17, 177.19, 210.7, 290.2

(56) References Cited

U.S. PATENT DOCUMENTS

| 4,814,426 A | 3/1989 | Usumi et al. |
| 4,985,538 A | 1/1991 | Fukuda et al. |
| 5,070,180 A | 12/1991 | Fukuda et al. |
| 5,932,685 A * | 8/1999 | Mori et al. ................. 428/347 |

FOREIGN PATENT DOCUMENTS

| EP | 0 349 960 | 1/1990 |
| EP | 0 532 943 | 3/1993 |
| EP | 0 82 648 2 | 3/1998 |

* cited by examiner

Primary Examiner—Donald J. Loney
(74) Attorney, Agent, or Firm—Kenyon & Kenyon

(57) ABSTRACT

The present invention provides a heat shrinkable polyester film whose hot water shrinkage along its main shrinkage direction is equal to or greater than 20% when the film is put in hot water of 70° C. for 5 sec; 35% to 55% when put in hot water of 75° C. for 5 sec; and 50% to 60% when put in hot water of 80° C. for 5 sec, wherein the compressive strength of the label formed by the film satisfies a following expression (1):

$$Y > X^{2.2} \qquad (1)$$

where y denotes compressive strength (mN) and x denotes film thickness ($\mu$m).

20 Claims, 1 Drawing Sheet

HEAT SHRINKABLE POLYESTER FILM

BACKGROUND OF THE INVENTION

1. Field of the Invention

The present invention relates to a heat shrinkable polyester film, and particularly to a heat shrinkable polyester film suitable for use in a label. More particularly, the present invention relates to a heat shrinkable polyester film for use in a label with high compressive strength, which has very few creases, uniform shrinkage, and minimal distortion occurring from a heat shrinkage process.

2. Description of the Related Art

Heat shrinkable polyester films made of polyvinyl chloride, polystyrene, or the like, are widely used in labels wrapped around the body of polyethylene terephthalate (PET) bottles. However, polyvinyl chloride products pose a hazard as they generate a chlorine gas when incinerated, and polystyrene products cause problems such as printing difficulties. Moreover, in order to recycle PET bottles, it is necessary to separate non-PET labels thereon which are made of polyvinyl chloride, polystyrene, etc., from the PET bottles. Thus, heat shrinkable films made of polyester, which are free of the above-mentioned problems, have been attracting public attention.

However, heat shrinkable polyester films have not been effective as shrinkable films for use in labels, because many of them shrink too rapidly resulting in creases, non-uniform shrinkage and distortion after the shrinkage. Moreover, such films are easily torn by an externally applied force after the shrinkage.

In order to avoid some of these problems, Japanese Patent Publication for Opposition No. 7-77757 discloses a method for improving a final shrinkage property by remarkably reducing a tearage strength along a direction perpendicular to its main shrinkage direction.

Moreover, Japanese Laid-Open Publication No. 58-64958 discloses a method for improving a final shrinkage property by reducing an orientation returning stress.

However, the films obtained by the above-mentioned methods could not achieve sufficient final shrinkage properties for use with small PET bottles whose shrink tunnel passing time is short. Thus the films were ineffective as shrinkage films. That is, when placing a tubular shape label, which is formed by a shrinkable film, around a PET bottle and performing a heat treatment to shrink the film onto the PET bottle, crease, non-uniform shrinkage, and distortion have sometimes occurred from the film shrinkage process.

In addition, the process speed for beverage bottling lines for PET bottles, and the like, is increasing. Therefore, the label is required to have a high-speed application property as well as a good final shrinkage property as mentioned above. In short, as illustrated in FIGS. 1 and 2, when a label 2 is placed around a PET bottle 1 in a high-speed process by a pressure member 3, if the high-speed application property is poor, the label cannot be applied properly due to insufficient rigidity of the label. The application property of the label is likely to depend greatly on the rigidity of the film, whereby it is possible to address such a problem by increasing a film thickness. However, problems occur when the film thickness increases. For example, a film thickness increase leads to an increase in weight, which results in a poor handling property. There are also other problems such as the film thickness increase leading to higher costs.

SUMMARY OF THE INVENTION

According to one aspect of this invention, there is provided a heat shrinkable polyester film whose hot water shrinkage along its main shrinkage direction is equal to or greater than 20% when the film is put in hot water of 70° C. for 5 sec; 35% to 55% when put in hot water of 75° C. for 5 sec; and 50% to 60% when put in hot water of 80° C. for 5 sec, wherein the compressive strength of the label formed by the film satisfies a following expression (1):

$$y > x^{2.2} \tag{1}$$

where y denotes compressive strength (mN) and x denotes film thickness ($\mu$m).

In one embodiment of the invention, the film has a thickness distribution of 6% or less.

According to another aspect of this invention, there is provided a label for a bottle which is produced by a heat shrinkable polyester film of the present invention.

Thus, the invention described herein makes possible the advantages of providing a heat shrinkable polyester film for use in various applications including a small PET bottle, with a good high-speed application property and a good final shrinkage property, without exceeding the film thickness of a conventional film.

These and other advantages of the present invention will become apparent to those skilled in the art upon reading and understanding the following detailed description with reference to the accompanying figures.

DESCRIPTION OF THE PREFERRED EMBODIMENTS

Figure 1:
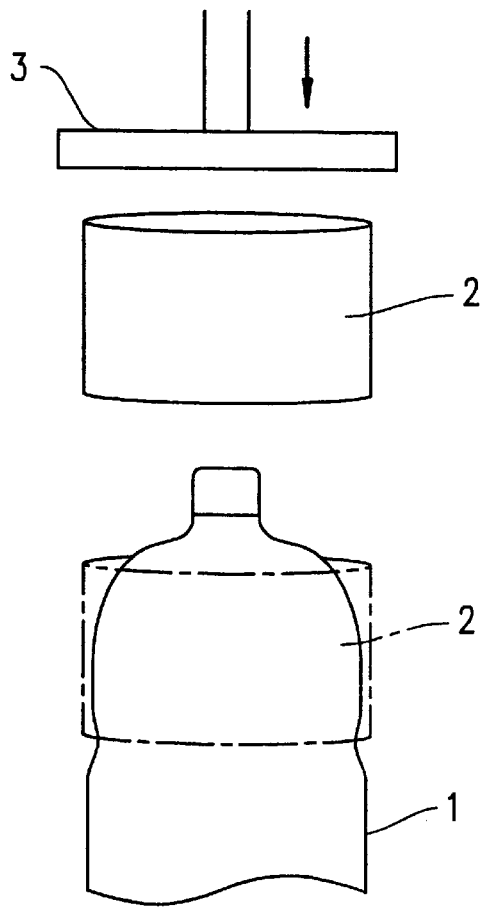
FIG. 1 illustrates a step of placing a shrinkable film around a PET bottle.
Figure 2:
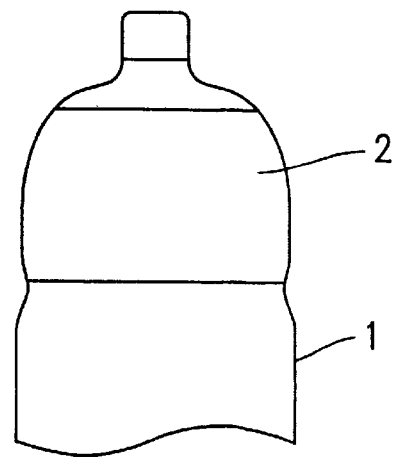
FIG. 2 is a front view illustrating a part of a PET bottle after a shrinkable film is shrunk onto the PET bottle.

Hereinafter, embodiments of the present invention will be described.

A heat shrinkable polyester film of the present invention is produced from a polyester comprising a dicarboxylic acid component and a diol component.

The dicarboxylic acid component of the polyester contains aromatic dicarboxylic acids (e.g., terephthalic acid, isophthalic acid, naphthalenedicarboxylic acid, and orthphthalic acid), aliphatic dicarboxylic acids (e.g., adipic acid, azelaic acid, sebacic acid, and decanedicarboxylic acid), and alicyclic dicarboxylic acids, or the like.

Where the polyester contains an aliphatic dicarboxylic acid(s) (e.g., adipic acid, sebacic acid, and decanedicarboxylic acid, or the like), the content of the aliphatic dicarboxylic acid is preferably less than 3 mol % (this applies to all the dicarboxylic acid components used). A heat shrinkable polyester film obtained by using a polyester which contains 3 mol % or more of such an aliphatic dicarboxylic acid(s) is likely to reduce its elongation at rupture along a direction perpendicular to its main shrinkage direction after a shrinkage process, and may not have a sufficient rigidity in a high-speed application process.

The polyester preferably does not contain a polyvalent carboxylic acid whose valence is 3 or more (e. g., a trimellitic acid, a pyromellitic acid, and anhydride thereof). If the polyester contains such a polyvalent carboxylic acid, the content thereof is preferably 3 mol % or less. With a heat shrinkable polyester film obtained by using the polyester containing such a polyvalent carboxylic acid, an elongation at rupture along a direction perpendicular to its main shrinkage direction after a shrinkage process is likely to be reduced, and a sufficient shrinkage may not be achieved.

The diol component of the polyester to be used in the present invention contains aliphatic diols (e.g., ethylene glycol, propane diol, butane diol, neopentyl glycol, hexane diol, or the like), alicyclic diols (e.g., 1,4-cyclohexane dimethanol), and aromatic diols, or the like.

The polyester used in the heat shrinkable polyester film of the present invention is preferably a polyester whose glass-transition temperature (Tg) is adjusted to 60° C. to 75° C. by mixing therein one or more diols whose carbon number is 3 to 6 (e.g., propane diol, butane diol, neopentyl glycol, and hexane diol).

In order to obtain a heat shrinkable polyester film having a particularly desirable final shrinkage property, neopentyl glycol can be used as one of the diol components, preferably in an amount of 15 mol % to 25 mol % (this applies to all the diol components used).

It is not preferable to contain a diol whose carbon number is 8 or more (e.g., octanediol) or a polyalcohol whose valence is 3 or more (e.g., trimethylolpropane, trimethylolethane, glycerin, and diglycerin). If such a diol or such a polyalcohol is contained, the content thereof is preferably 3 mol % or less. With a heat shrinkable polyester film obtained by using a polyester containing more than 3 mol % of a diol or a polyalcohol, a sufficient shrinkage may not be achieved.

The polyester preferably contains the least amount possible of diethylene glycol, triethylene glycol, and polyethylene glycol. Although, diethylene glycol is likely to be present in the polyester used in the present invention because it is a byproduct from a polyester polymerization process, the content of diethylene glycol is preferably less than 4 mol %.

A preferable acid component and a diol component used for the polyester of the present invention are as follows. The main acid component is a terephthalic acid, mixed with 14 mol % or more of an isophthalic acid and an adipic acid less than 5 mol %. Moreover, the main diol component is an ethylene glycol, mixed with 5 mol % to 15 mol % of butanediol.

When two or more polyesters are mixed together, the above-mentioned acid component content and the diol component content are determined with respect to the acid component and the diol component, respectively, of all the polyesters. These contents are irrespective of whether ester interchange occurs after mixing.

Moreover, in order to improve smoothness of a heat shrinkable polyester film, the film preferably contains an inorganic lubricant and an organic lubricant. The inorganic lubricant may be, for example, titanium dioxide, fine particle silica, kaoline, or calcium carbonate. The organic lubricant may be, for example, a long-chain fatty acid ester. Optionally, the film further contains additives such as a stabilizer, a coloring agent, an antioxidant, a defoamer, an antistatic agent, and an ultraviolet sorbent.

The above-mentioned polyesters may be produced through polymerization by a conventional method. For example, the polyester can be obtained by using, for example, a direct esterification method, where a dicarboxylic acid and a diol are directly reacted with each other, or a transesterification method, where a dimethyl dicarboxylate and a diol are reacted with each other. The polymerization may be performed either in a batch process or a continuous process.

The hot water shrinkage of the heat shrinkable polyester film of the present invention can be determined as follows. The film is subjected to a no-load treatment in hot water. Based on the length of the film before shrinkage and the length after shrinkage, the hot water shrinkage of the film can be calculated by the expression: Heat shrinkage= ((length before shrinkage−length after shrinkage)/length before shrinkage)×100(%). The heat shrinkable polyester film of the present invention has a hot water shrinkage of 20% or more, and preferably 22% to 35%, along its main shrinkage direction when the film is put in hot water of 70° C. for 5 sec; 35% to 55%, and preferably 40% to 50%, when put in hot water of 75° C. for 5 sec; 50% to 60%, when put in hot water of 80° C. for 5 sec.

When the hot water shrinkage along the main shrinkage direction is less than 20% at 70° C. for 5 sec, the low temperature shrinkage of the film may be insufficient, whereby it may be necessary to increase the shrinkage temperature, which is undesirable. When the shrinkage exceeds 50%, jumping of the label may occur from the heat shrinkage process, which is undesirable.

The hot water shrinkage of the film of the present invention is 35% to 55% when put in hot water of 75° C. for 5 sec. When the shrinkage is less than 35%, the film will not sufficiently shrink near the entrance section of the bottle, which is undesirable (that is, when a bottle or the like is packaged with the film and passed through a shrink tunnel, the film is likely to have creases and/or non-uniform shrinkage in a petal-like pattern along the edge of the film). When the shrinkage exceeds 55%, the label may still have a shrinking force even after the heat shrinkage process, whereby the label is likely to jump from the bottle.

The hot water shrinkage is 50% to 60% when put in hot water of 80° C. for 5 sec. When the shrinkage is less than 50%, the film will not sufficiently shrink near the entrance section of the bottle, which is undesirable. When the shrinkage exceeds 60%, the label may still have a shrinking force even after the heat shrinkage process, whereby the label is likely to jump from the bottle.

The compressive strength of a label produced from a heat shrinkable polyester film of the present invention has a compressive strength which satisfies the following expression (1):

$$y > x^{2.2} \tag{1}$$

where y denotes compressive strength (mN) and x denotes film thickness ($\mu$m).

The preferable compressive strength y of a label is as follows.

$$y > 1.1 x^{2.2} \tag{1'}$$

While the compressive strength is influenced by the film thickness, there may be a label application defect due to a high-speed application machine property when the above-mentioned expression is not satisfied.

The thickness x of the heat shrinkable polyester film of the present invention is not limited to any particular value. As a heat shrinkable film for use in a label, the thickness of the film is preferably 10 $\mu$m to 200 $\mu$m, and more preferably 20 $\mu$m to 100 $\mu$m.

Next, a specific example of the method for producing a heat shrinkable polyester film of the present invention will be described, though the present invention is not limited to such a method.

According to the present invention, a polyester material is first dried by using a dryer such as a hopper dryer or a paddle dryer or a vacuum dryer. Then, the polyester material is melted and extruded into a film at a temperature of 200° C.

to 300° C., and rapidly cooled to obtain an undrawn film. The extrusion process may be done with any known method such as a T-die method, or a tubular method.

The obtained undrawn film is then drawn at a temperature equal to or greater than Tg−5° C. and less than Tg+15° C. (for example, 70° C.–90° C.) along the longitudinal direction (extrusion direction) by a drawing factor of 1.05 or more, and preferably 1.05 to 1.20. Then, after a pre-heating treatment is performed, the film is drawn along the transverse direction (direction perpendicular to the extrusion direction) by a drawing factor of 4.5 or more, and preferably 4.7 to 5.2 (first drawing step). By pre-heating the film, shrinkage is restricted and the film rigidity increased. Then, the film is drawn further at a temperature of 65° C. to 85° C. along the transverse direction by a drawing factor of 1.05 or more (second drawing step). Thus, the heat shrinkable polyester film of the present invention is obtained.

By drawing a film in such a two-step drawing process, the film rigidity increases, and problems can be reduced during a high-speed shrinkage and a high-speed application.

The drawing process may be a biaxial drawing in which the film is drawn in the longitudinal direction and then drawn with a tenter in the transverse direction. Such a biaxial drawing may be either a successive biaxial drawing method or a simultaneous biaxial drawing method. After this drawing process, the film may optionally be further drawn in the longitudinal or transverse direction.

In order to achieve the objects of the present invention, it is more practical to have the main shrinkage direction along the transverse direction. Therefore, an exemplary film production method where the main shrinkage direction is along the transverse direction has been described above. However, it is understood that the main shrinkage direction may alternatively be along the longitudinal direction, in which case the above-described method can be used only with the drawing directions being rotated by 90 degrees.

In the present invention, an undrawn film obtained from a polyester is preferably drawn at a temperature equal to or greater than Tg−5° C. and less than Tg+15° C.

It is not preferable to draw the film at a temperature less than Tg−5+C. In such a case, the sufficient heat shrinkage, a feature of the present invention, may not be obtained, and further the transparency of the obtained film may deteriorate.

In addition, it is not preferable to draw the film at a temperature of Tg+15° C. or more. In such a case, the film may not have sufficient rigidity in the high-speed processes, and further the film may have a substantially increased thickness variation.

The heat shrinkable polyester film of the present invention preferably has a film thickness distribution of 6% or less, and more preferably 5% or less. The film thickness distribution can be calculated based on the following expression: Thickness distribution=((maximum thickness−minimum thickness)/average thickness)×100 (%).

A three-color printing test is performed to evaluate the final shrinkage properties of the film. With a film having a thickness distribution of 6% or less, it is easy to superimpose the colors on one another. However, with a film having a thickness distribution greater than 6%, the colors may not be desirably superimposed on one another.

In order to reduce the thickness distribution of a heat shrinkable polyester film, it is preferred to heat the film to a predetermined temperature with hot air at a low flow rate such that the heat transfer coefficient is 0.0013 cal/cm$^2$·sec·° C. or less in a pre-heat process, which is performed before the drawing process for drawing the film with a tenter in the transverse direction.

In order to suppress heat generation inside the film associated with the drawing process and thus to reduce the non-uniform film temperature in the width direction, the heat transfer coefficient in the drawing process should be 0.0009 cal/cm$^2$·sec·° C. or more, and preferably 0.0011 to 0.0017 cal/cm$^2$·sec·° C.

When the heat transfer coefficient in the pre-heat process exceeds 0.0013 cal/cm$^2$·sec·° C. or when that in the drawing process is less than 0.0009 cal/cm$^2$·sec·° C., the thickness is likely to be non-uniform. In such a case, when a multi-color printing is performed on the obtained film, the colors of a printed pattern may not be properly superimposed on one another.

A label of the present invention can be produced as follows. First, a sheet of heat shrinkable film in a rectangular shape having a predetermined size is rolled into a tubular shape with two of its opposite edges bonded together. Then, the tubular film is cut into smaller label pieces. The method of bonding is not limited to any particular method. For example, a solvent or a swelling agent is applied on at least one of two opposite edges of the heat shrinkable polyester film, the opposite edges are bonded together before the solvent or the swelling agent dries up.

EXAMPLES

The present invention will now be described in greater detail by way of examples. However, the present invention is not limited to these examples, but other examples may be possible without departing from the scope of the present invention.

The evaluation methods used in the present invention will now be described.

(1) Heat Shrinkage

A sheet of film was cut into 10 cm×10 cm pieces, and subjected to a no-load treatment in hot water for a predetermined time at a predetermined temperature of±0.5° C. so as to heat-shrink the film. Then, the longitudinal and transverse dimensions of the film were measured so as to obtain the heat shrinkage of the film according to the following expression (2). The direction along which the heat shrinkage was greater was assumed to be the main shrinkage direction of the film.

Heat shrinkage={(length before shrinkage−length after shrinkage)/length before shrinkage}×100(%) (2)

(2) Final Shrinkage Property

A three-color printing test using three colors of yellow, gold and white manufactured by Toyo Ink Mfg. Co., Ltd. was performed on a heat shrinkable film in advance.

A test was conducted using in each a round bottle sample of 500 ml (20.6 cm in height, 6.5 cm in diameter at the center, a bottle of "Gogo no Kocha" of Kirin Beverage Corporation manufactured by Yoshino Kogyo Co., Ltd.), which was passed through a Steam Tunnel (Model: SH-1500-L) manufactured by Fuji Astec Inc for a passage time of 2.5 sec, zone temperature of 80° C. (20 samples were evaluated).

The evaluation was done by visual observation with the criteria shown below.

○: No creasing, jumping or insufficient shrinkage observed

X: Creasing, jumping or insufficient shrinkage observed (3) Compressive Strength A square tubular label a 120 mm in height and 175 mm in diameter was produced to measure its compressive strength in a vertical direction. A strograph (Model: V10-C) manufactured by Toyo Seiki Co., Ltd. was used to measure a maximum value of compressive strength, (mN) at a cross head speed of 200 mm/min in a compressive mode (5 samples were evaluated).

(4) Tg (Glass-transition Temperature)

A differential scanning calorimeter (DSC) (Model: DSC220) manufactured by Seiko Instruments & Electronics Ltd. was used to raise the temperature of an undrawn film (10 mg) from −40° C. to 120° C. at a temperature rising rate of 20° C./min to obtain an endothermic curve. The glass-transition temperature of the film was obtained based on the obtained endothermic curve. A tangential line was drawn immediately before and after an inflection point along the endothermic curve to obtain Tg (glass-transition temperature) at the intersection between the tangential lines.

(5) Thickness Distribution

A contact thickness meter (Model: KG60/A) manufactured by Anritsu Corporation was used to test the thickness of the sample which was 5 cm along the longitudinal direction and 50 cm along the transverse direction (20 samples were evaluated). The thickness distribution (thickness variation) of each sample was tested by the expression (3) as shown below. In addition, the average value (n=50) of the thickness distribution was evaluated by the criteria shown below.

$$\text{Thickness distribution} = ((\text{maximum thickness} - \text{minimum thickness})/\text{average thickness}) \times 100(\%) \quad (3)$$

○: equal to or less than 6%

Δ: greater than 6% and less than 10%

X: equal to or more than 10%

The following polyesters were used in the examples and comparative examples to be described below.

Polyester A: polyethylene terephthalate (intrinsic viscosity (IV): 0.75 dl/g)

Polyester B: a polyester comprising 78 mol % of terephthalic acid, 22 mol % of isophthalic acid and ethylene glycol (IV: 0.72 dl/g)

Polyester C: a polyester comprising 65 mol % of terephthalic acid, 10 mol % of isophthalic acid, 25 mol % of adipic acid and butanediol (IV: 0.77 dl/g)

Polyester D: a polyester comprising 70 mol % of terephthalic acid, 30 mol % of adipic acid and ethylene glycol (IV: 0.70 dl/g)

Polyester E: a polyester comprising 53 mol % of terephthalic acid, 47 mol % of sebacic acid and ethylene glycol (IV: 1.10 dl/g)

Polyester F: a polyester comprising terephthalic acid, 70 mol % of ethylene glycol and 30 mol % of neo pentyl glycol (IV: 0.72 dl/g)

Polyester G: polybutylene terephthalate (IV: 1.20 dl/g)

Example 1

A polyester obtained by mixing together 20 wt % of Polyester A, 70 wt % of Polyester B and 10 wt % of Polyester C was melted and extruded through a T die at a temperature of 280° C., and rapidly cooled down by using a chill roll to obtain an undrawn film. The Tg of the undrawn film was 69° C.

The undrawn film was drawn in the longitudinal direction by a drawing factor of 1.1 at a film temperature of 80° C. After the film was pre-heated until reaching 88° C. under a heat transfer coefficient of 0.033 W/(m·° C.), the undrawn film was drawn with a tenter in the transverse direction at a film temperature of 70° C. by a drawing factor of 4.6 (first drawing step). The film was then subjected to a heat treatment at 70° C. for 10 sec, and further drawn in the transverse direction at the film. temperature of 68° C. by a drawing factor of 1.1 (second drawing step) to obtain a heat shrinkable polyester film having a thickness of 50 μm.

Example 2

A polyester obtained by mixing together 10 wt % of Polyester A, 70 wt % of Polyester B and 20 wt % of polyester D was melted and extruded through a T die at a temperature of 280° C., and rapidly cooled down by using a chill roll to obtain an undrawn film. The Tg of the undrawn film was 67° C.

The undrawn film was drawn in the longitudinal direction by a drawing factor of 1.1 at a film temperature of 80° C. After the film was pre-heated until reaching 68° C. under the heat transfer coefficient of 0.033 W/(m·° C.), the undrawn film was drawn with a tenter in the transverse direction at the film temperature of 68° C. by a drawing factor of 4.6 (first drawing step). The film was then subjected to a heat treatment at 69° C. for 10 sec, and further drawn in the transverse direction at the film temperature of 68° C. by a drawing factor of 1.1 (second drawing step) to obtain a heat shrink able polyester film having a thickness of 50 μm.

Example 3

A heat shrinkable polyester film having a thickness of 50 μm was obtained in a manner similar to that of Example 1 except using a polyester obtained by mixing together 6 wt % of Polyester A, 84 wt % of Polyester B and 10 wt % of Polyester C.

Example 4

A heat shrinkable polyester film having a thickness of 50 μm was obtained in a manner similar to that of Example 1 except using a polyester obtained by mixing together 15 wt % of Polyester A, 75 wt % of Polyester B and 10 wt % of Polyester E.

Example 5

A heat shrinkable polyester film having a thickness of 50 μm was obtained in a manner similar to that of Example 1 except drawing the undrawn film in the transverse direction at the film temperature of 72° C. by a drawing factor of 5.5 (first drawing step).

Example 6

A heat shrinkable polyester film having a thickness of 50 μm was obtained in a manner similar to that of Example 1 except drawing the undrawn film in the longitudinal direction by a drawing factor of 1.5.

Comparative Example 1

A heat shrinkable polyester film having a thickness of 50 μm was obtained in a manner similar to that of Example 1 except that the first drawing film temperature was 80° C.

Comparative Example 2

A heat shrinkable polyester film-having a thickness of 50 μm was obtained in a manner similar to that of Example 2 except that the first drawing film temperature was 80° C.

Comparative Example 3

A polyester obtained by mixing together 20 wt % of Polyester A, 70 wt % of polyester B and 10 wt % of polyester C was melted and extruded through a T die at a temperature of 280° C., and rapidly cooled down by using a chill roll to obtain an undrawn film.

The undrawn film was drawn with a tenter in the transverse direction by a drawing factor of 4.0 at a film temperature of 73° C., after the film temperature was pre-heated until reaching 85° C. under the heat transfer coefficient of 0.033 W/(m·° C.). The film was then subjected to a heat treatment at 68° C. for 10 sec to obtain a heat shrinkable polyester film having a thickness of 50 µm.

Comparative Example 4

A heat shrinkable polyester film having a thickness of 50 µm was obtained in a manner similar to that of Comparative Example 3 except using a polyester obtained by mixing together 25 wt % of polyester A, 50 wt % of polyester B and 25 wt % of Polyester G, and drawing the film in the transverse direction at a film temperature of 74° C.

The evaluation results for the respective films of Examples 1–6 and Comparative Examples 1–4 are shown together in Table 1 below.

Thus, each of the heat shrinkable polyester films obtained in Comparative Examples 1–4 had a poor quality and a low practicability.

According to the present invention, a heat shrinkage film with a good final shrinkage property and with very few creases, uniform shrinkage, minimal distortion, and sufficient shrinkage occurring from a heat shrinkage process can be obtained. Furthermore, the obtained heat shrinkage film has a sufficient film rigidity which endures a high-speed applying process, and a shrinkage property which shows a high shrinkage in a short time.

Therefore, the heat shrinkable polyester film of the present invention is suitable for use in PET bottle label applications, in which a high-speed label application and shrinkage process is desired.

What is claimed is:

1. A heat shrinkable polyester film whose hot water shrinkage along its main shrinkage direction is equal to or greater than 20% when the film is put in hot water of 70° C. for 5 sec; 35% to 55% when put in hot water of 75° C. for 5 sec; and 50% to 60% when put in hot water of 80° C. for 5 sec, wherein the compressive strength of a label formed by the film satisfies a following expression:

TABLE 1

| | Materials | | | | | | | Drawing factor | | Drawing temperature (° C.) | Hot water shrinkage along the main shrinkage direction (%) | | | Final shrinkage property | Compressive strength (mN) | Thickness distribution |
| | Polyester A | Polyester B | Polyester C | Polyester D | Polyester E | Polyester F | Polyester G | Longitudinal direction | Transverse direction | | 70° C. | 75° C. | 80° C. | | | |
|---|---|---|---|---|---|---|---|---|---|---|---|---|---|---|---|---|
| Example 1 | 20 | 70 | 10 | — | — | — | — | 1.1 | 5.0 | 70 | 27 | 46 | 55 | ◯ | 6300 | ◯ |
| Example 2 | 10 | 70 | — | 20 | — | — | — | 1.1 | 5.0 | 68 | 30 | 46 | 52 | ◯ | 6600 | ◯ |
| Example 3 | 6 | 84 | 10 | — | — | — | — | 1.1 | 5.0 | 71 | 27 | 47 | 58 | ◯ | 6300 | ◯ |
| Example 4 | 15 | 75 | — | — | 10 | — | — | 1.1 | 5.0 | 71 | 34 | 47 | 53 | ◯ | 6400 | ◯ |
| Example 5 | 20 | 70 | 10 | — | — | — | — | 1.1 | 6.0 | 72 | 27 | 46 | 58 | ◯ | 6800 | ◯ |
| Example 6 | 20 | 70 | 10 | — | — | — | — | 1.5 | 5.0 | 70 | 27 | 46 | 55 | ◯ | 6700 | ◯ |
| Comparative example 1 | 20 | 70 | 10 | — | — | — | — | 1.1 | 5.0 | 80 | 22 | 40 | 50 | Δ | 5700 | Δ |
| Comparative example 2 | 10 | 70 | — | 20 | — | — | — | 1.1 | 5.0 | 80 | 25 | 38 | 48 | Δ | 5800 | Δ |
| Comparative example 3 | 20 | 70 | 10 | — | — | — | — | 1.0 | 4.0 | 70 | 27 | 46 | 54 | ◯ | 5900 | ◯ |
| Comparative example 4 | 25 | — | — | — | — | 50 | 25 | 1.0 | 4.0 | 74 | 28 | 46 | 55 | ◯ | 4950 | ◯ |

Polyester A: TPA//EG = 100//100 (mol %)
Polyester B: TPA/IPA//EG = 78/22//100
Polyester C: TPA/IPA/AA//BD = 65/10/25//100
Polyester D: TPA/AA//EG = 70/30//100
Polyester E: TPA/SA//EG = 53/47//100
Polyester F: TPA//EG/NPG = 100//70/30
Polyester G: TPA//BD = 100//100

As is apparent from Table 1, each of the heat shrinkable polyester films obtained in Examples 1–6 exhibit a good final shrinkage property, a sufficient compressive strength and a good thickness distribution. The heat shrinkable polyester film of the present invention has a high quality and a high practicability, and is particularly suitable for a shrinkable label use.

On the other hand, each of the heat shrinkable films obtained in Comparative Examples 1 and 2 exhibited poor final shrinkage property and poor thickness distribution. Moreover, the heat shrinkable films obtained in Comparative Examples 3 and 4 exhibited poor compressive strength.

$$y > x^{2.2}$$

where y denotes compressive strength (mN) and x denotes film thickness (µm).

2. A heat shrinkable polyester film according to claim 1, wherein the film has a thickness distribution of 6% or less.

3. A label for a bottle which is produced by a heat shrinkable polyester film according to claim 1.

4. A heat shrinkable polyester film according to claim 1, wherein the compressive strength of the label formed by the film satisfies a following expression:

$$y > 1.1 x^{2.2}$$

where y denotes compressive strength (mN) and x denotes film thickness (μm).

5. A heat shrinkable polyester film according to claim 1, wherein the thickness of the film is between 10 μm and 200 μM.

6. A heat shrinkable polyester film according to claim 5, wherein the thickness of the film is between 20 μM and 200 μM.

7. A heat shrinkable polyester film according to claim 1, wherein the polyester has an acid component and a diol component, wherein the main acid component is terephthalic acid, mixed with 14 mol % or more of isophthalic acid and less than 5 mol % of an adipic acid, and wherein the main diol component is an ethylene glycol, mixed with 5 mol % to 15 mol % of butanediol.

8. A heat shrinkable polyester film according to claim 7, wherein the polyester contains less than 4 mol % diethylene glycol.

9. A method of producing a heat shrinkable polyester film consisting of:
   a) drying a polyester material;
   b) melting the polyester material;
   c) extruding it into a film at a temperature of 200° C. to 300° C. and rapidly cooling the film to obtain an undrawn film;
   d) drawing the undrawn film at a temperature equal to or greater than Tg−5° C. and less than Tg+15° C. along a first direction by a drawing factor of 1.05 or more;
   e) pre-heating the film;
   f) drawing the film along a second direction (perpendicular to the first direction) by a drawing factor of 4.5 or more (first drawing step);
   g) drawing the film further at a temperature of 65° C. to 85° C. along the second direction by a drawing factor of 1.05 or more (second drawing step),
wherein Tg is the glass transition temperature of the film.

10. The method of claim 9, wherein the drawing temperature in step d) is 70° C.–90° C.

11. The method of claim 9, wherein the drawing factor instep d) is 1.05 to 1.20.

12. The method of claim 9, wherein the drawing factor in step d) is 4.7 to 5.2.

13. The method of claim 9, wherein the drawing is a biaxial drawing in which the film is drawn in the first direction and then drawn with a tenter in the second direction.

14. The method of claim 13, wherein the biaxial drawing is a successive biaxial drawing.

15. The method of claim 13, wherein the biaxial drawing is a simultaneous biaxial drawing.

16. The method of claim 9, wherein the first direction is the longitudinal direction (extrusion direction) and the second direction is the transverse direction (perpendicular to the extrusion direction).

17. A heat shrinkable polyester film produced by the method of claim 9.

18. A heat shrinkable polyester film according to claim 17, wherein the thickness of the film is between 10 μM and 200 μM.

19. A heat shrinkable polyester film according to claim 17, wherein the thickness of the film is between 20 μM and 200 μM.

20. A heat shrinkable polyester film according to claim 17, whose hot water shrinkage along its main shrinkage direction is equal to or greater than 20% when the film is put in hot water of 70° C. for 5 sec; 35% to 55% when put in hot water of 75° C. for 5 sec; and 50% to 60% when put in hot water of 80° C. for 5 sec, wherein the compressive strength of a label formed by the film satisfies a following expression:

$$y > 1.1 x^{2.2}$$

where y denotes compressive strength (mN) and x denotes film thickness (μm).

* * * * *